(12) United States Patent
Casper et al.

(10) Patent No.: US 8,312,189 B2
(45) Date of Patent: *Nov. 13, 2012

(54) PROCESSING OF DATA TO MONITOR INPUT/OUTPUT OPERATIONS

(75) Inventors: Daniel F. Casper, Poughkeepsie, NY (US); John R. Flanagan, Poughkeepsie, NY (US); Catherine C. Huang, Poughkeepsie, NY (US); Matthew J. Kalos, Tucson, AZ (US); Louis W. Ricci, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,023

(22) Filed: Feb. 14, 2008

(65) Prior Publication Data

US 2009/0210571 A1 Aug. 20, 2009

(51) Int. Cl.
*G06F 3/00* (2006.01)
(52) U.S. Cl. ....... 710/58; 710/3; 710/4; 711/1; 711/100; 711/101
(58) Field of Classification Search ............ 710/19, 710/3, 4, 20; 711/1, 100, 101
See application file for complete search history.

(56) References Cited

U.S. PATENT DOCUMENTS

| | | |
|---|---|---|
| 3,943,283 A | 3/1976 | Caragliano et al. |
| 4,004,277 A | 1/1977 | Gavril |
| 4,374,415 A | 2/1983 | Cormier et al. |
| 4,380,046 A | 4/1983 | Frosch et al. |
| 4,414,644 A | 11/1983 | Tayler |
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,866,609 A | 9/1989 | Calta et al. |
| 4,870,566 A | 9/1989 | Cooper et al. |
| 5,016,160 A | 5/1991 | Lambeth et al. |

(Continued)

FOREIGN PATENT DOCUMENTS

DE 3931514 3/1990

(Continued)

OTHER PUBLICATIONS

Brice, et al.; U.S. Appl. No. 11/464,613; "Flexibility Controlling The Transfer of Data between Input/Output Devices and Memory"; Filed Aug. 15, 2006; Specification having 23 pages and Drawings having 4 sheets.

(Continued)

*Primary Examiner* — Ernest Unelus
(74) *Attorney, Agent, or Firm* — Cantor Colburn LLP; John Campbell

(57) ABSTRACT

A computer program product, an apparatus, and a method for processing communications between a control unit and a channel subsystem in an input/output processing system are provided. The computer program product includes a tangible storage medium readable by a processing circuit and storing instructions for execution by the processing circuit for performing a method. The method includes: sending a command from the channel subsystem to the control unit to initiate an input/output operation; setting a time period for completion of the operation; and responsive to the operation not completing within the time period, sending a message to determine whether the control unit has an exchange open for the command.

24 Claims, 11 Drawing Sheets

U.S. PATENT DOCUMENTS

| | | | |
|---|---|---|---|
| 5,031,091 A | 7/1991 | Wakatsuki et al. | |
| 5,040,108 A | 8/1991 | Kanazawa | |
| 5,325,492 A | 6/1994 | Bonevento et al. | |
| 5,386,512 A | 1/1995 | Crisman et al. | |
| 5,388,219 A | 2/1995 | Chan et al. | |
| 5,410,727 A | 4/1995 | Jaffe et al. | |
| 5,434,980 A | 7/1995 | Casper et al. | |
| 5,440,729 A | 8/1995 | Kimura et al. | |
| 5,461,721 A | 10/1995 | Cormier et al. | |
| 5,463,736 A | 10/1995 | Elko et al. | |
| 5,465,359 A | 11/1995 | Allen et al. | |
| 5,500,942 A | 3/1996 | Eickemeyer et al. | |
| 5,517,670 A | 5/1996 | Allen et al. | |
| 5,526,484 A | 6/1996 | Casper et al. | |
| 5,528,755 A | 6/1996 | Beardsley et al. | |
| 5,539,918 A | 7/1996 | Allen et al. | |
| 5,546,533 A | 8/1996 | Koyama | |
| 5,561,809 A | 10/1996 | Elko et al. | |
| 5,584,039 A | 12/1996 | Johnson et al. | |
| 5,600,793 A | 2/1997 | Nord | |
| 5,608,898 A | 3/1997 | Turpin et al. | |
| 5,613,163 A | 3/1997 | Marron et al. | |
| 5,640,600 A | 6/1997 | Satoh et al. | |
| 5,758,190 A | 5/1998 | Johnson et al. | |
| 5,768,620 A | 6/1998 | Johnson et al. | |
| 5,787,071 A | 7/1998 | Basso et al. | |
| 5,831,985 A | 11/1998 | Sandorfi | |
| 5,860,022 A | 1/1999 | Kondou et al. | |
| 5,894,583 A | 4/1999 | Johnson et al. | |
| 5,901,327 A | 5/1999 | Ofek | |
| 5,918,028 A | 6/1999 | Silverthorn et al. | |
| 6,125,399 A | 9/2000 | Hamilton | |
| 6,202,095 B1 | 3/2001 | Beardsley et al. | |
| 6,230,218 B1 | 5/2001 | Casper et al. | |
| 6,338,105 B1* | 1/2002 | Niizuma et al. | 710/72 |
| 6,343,335 B1 | 1/2002 | Dahman et al. | |
| 6,347,334 B1 | 2/2002 | Fredericks et al. | |
| 6,353,612 B1 | 3/2002 | Zhu et al. | |
| 6,401,223 B1 | 6/2002 | DePenning | |
| 6,466,590 B1 | 10/2002 | Park et al. | |
| 6,484,217 B1 | 11/2002 | Fuente et al. | |
| 6,546,435 B1 | 4/2003 | Yoshimura et al. | |
| 6,584,511 B1 | 6/2003 | Marsh, III et al. | |
| 6,594,785 B1 | 7/2003 | Gilbertson et al. | |
| 6,609,161 B1 | 8/2003 | Young | |
| 6,609,165 B1 | 8/2003 | Frazier | |
| 6,647,016 B1 | 11/2003 | Isoda et al. | |
| 6,651,125 B2* | 11/2003 | Maergner et al. | 710/244 |
| 6,654,954 B1 | 11/2003 | Hicks | |
| 6,658,603 B1 | 12/2003 | Ward | |
| 6,687,766 B1 | 2/2004 | Casper et al. | |
| 6,693,880 B2 | 2/2004 | Gregg et al. | |
| 6,694,390 B1 | 2/2004 | Bogin et al. | |
| 6,751,680 B2 | 6/2004 | Langerman et al. | |
| 6,772,207 B1 | 8/2004 | Dorn et al. | |
| 6,826,661 B2 | 11/2004 | Umbehocker et al. | |
| 6,839,773 B2* | 1/2005 | Vishlitzky et al. | 710/5 |
| 6,862,322 B1 | 3/2005 | Ewen et al. | |
| 6,898,202 B2 | 5/2005 | Gallagher et al. | |
| 6,915,378 B2 | 7/2005 | Roberti | |
| 6,963,940 B1 | 11/2005 | Glassen et al. | |
| 7,000,036 B2 | 2/2006 | Carlson et al. | |
| 7,003,700 B2 | 2/2006 | Elko et al. | |
| 7,020,810 B2 | 3/2006 | Holman | |
| 7,035,540 B2 | 4/2006 | Finan et al. | |
| 7,058,735 B2 | 6/2006 | Spencer | |
| 7,100,096 B2 | 8/2006 | Webb, Jr. et al. | |
| 7,111,130 B2 | 9/2006 | Blake et al. | |
| 7,120,728 B2 | 10/2006 | Krakirian et al. | |
| 7,124,207 B1 | 10/2006 | Lee et al. | |
| 7,133,988 B2 | 11/2006 | Fujibayashi | |
| 7,149,823 B2 | 12/2006 | Miller et al. | |
| 7,155,569 B2 | 12/2006 | Johnson et al. | |
| 7,164,425 B2 | 1/2007 | Kwak et al. | |
| 7,202,801 B2 | 4/2007 | Chou | |
| 7,277,387 B2 | 10/2007 | Sanders et al. | |
| 7,292,597 B2 | 11/2007 | Mills et al. | |
| 7,315,911 B2 | 1/2008 | Davies et al. | |
| 7,382,733 B2 | 6/2008 | Banerjee et al. | |
| 7,395,284 B2 | 7/2008 | Sato et al. | |
| 7,398,335 B2 | 7/2008 | Sonksen et al. | |
| 7,484,021 B2 | 1/2009 | Rastogi et al. | |
| 7,500,030 B2 | 3/2009 | Hathorn et al. | |
| 7,539,777 B1 | 5/2009 | Aitken | |
| 7,543,087 B2 | 6/2009 | Philbrick et al. | |
| 7,555,554 B2 | 6/2009 | Manders et al. | |
| 7,558,827 B2 | 7/2009 | Kawashima et al. | |
| 7,564,791 B2 | 7/2009 | Jayakrishnan et al. | |
| 7,577,772 B2 | 8/2009 | Sonksen et al. | |
| 7,577,773 B1 | 8/2009 | Gandhi et al. | |
| 7,594,057 B1 | 9/2009 | Gandhi et al. | |
| 7,599,360 B2 | 10/2009 | Edsall et al. | |
| 7,711,871 B1 | 5/2010 | Haechten et al. | |
| 7,743,197 B2 | 6/2010 | Chavan et al. | |
| 7,765,336 B2 | 7/2010 | Butler et al. | |
| 7,826,349 B2 | 11/2010 | Kaur et al. | |
| 7,840,717 B2 | 11/2010 | Flanagan et al. | |
| 7,840,718 B2 | 11/2010 | Ricci et al. | |
| 7,840,719 B2 | 11/2010 | Casper et al. | |
| 7,856,511 B2 | 12/2010 | Ricci et al. | |
| 7,941,570 B2 | 5/2011 | Flanagan et al. | |
| 2001/0030943 A1 | 10/2001 | Gregg et al. | |
| 2002/0062407 A1 | 5/2002 | Tateyama et al. | |
| 2002/0099967 A1 | 7/2002 | Kawaguchi | |
| 2002/0152338 A1 | 10/2002 | Elliott et al. | |
| 2002/0178404 A1 | 11/2002 | Austen et al. | |
| 2003/0002492 A1 | 1/2003 | Gallagher et al. | |
| 2003/0056000 A1 | 3/2003 | Mullendore et al. | |
| 2003/0084213 A1 | 5/2003 | Brice, Jr. et al. | |
| 2003/0158998 A1* | 8/2003 | Smith | 711/112 |
| 2003/0188053 A1 | 10/2003 | Tsai | |
| 2003/0208581 A1 | 11/2003 | Behren et al. | |
| 2004/0030822 A1 | 2/2004 | Rajan et al. | |
| 2004/0054776 A1 | 3/2004 | Klotz et al. | |
| 2004/0113772 A1 | 6/2004 | Hong Chou | |
| 2004/0136241 A1 | 7/2004 | Rapp et al. | |
| 2004/0151160 A1 | 8/2004 | Sanders et al. | |
| 2004/0193968 A1 | 9/2004 | Dugan et al. | |
| 2004/0210719 A1 | 10/2004 | Bushey et al. | |
| 2004/0260851 A1 | 12/2004 | Tu | |
| 2005/0018673 A1 | 1/2005 | Dropps et al. | |
| 2005/0102456 A1 | 5/2005 | Kang | |
| 2005/0105456 A1 | 5/2005 | Cookson et al. | |
| 2005/0108251 A1 | 5/2005 | Hunt | |
| 2005/0175341 A1 | 8/2005 | Ovadia | |
| 2005/0193029 A1 | 9/2005 | Rom et al. | |
| 2005/0204069 A1 | 9/2005 | Carlson et al. | |
| 2005/0223291 A1 | 10/2005 | Zimmer et al. | |
| 2005/0229033 A1* | 10/2005 | Tanaka et al. | 714/6 |
| 2005/0257118 A1 | 11/2005 | Shien | |
| 2006/0036769 A1* | 2/2006 | Frey et al. | 709/248 |
| 2006/0050726 A1 | 3/2006 | Ahmed et al. | |
| 2006/0085595 A1 | 4/2006 | Slater | |
| 2006/0159112 A1 | 7/2006 | Sundaram et al. | |
| 2006/0224795 A1 | 10/2006 | Muto et al. | |
| 2007/0005838 A1 | 1/2007 | Chang et al. | |
| 2007/0016554 A1 | 1/2007 | Dapp et al. | |
| 2007/0061463 A1 | 3/2007 | Hiramatsu et al. | |
| 2007/0072543 A1 | 3/2007 | Paila et al. | |
| 2007/0079051 A1 | 4/2007 | Tanaka et al. | |
| 2007/0091497 A1 | 4/2007 | Mizuno et al. | |
| 2007/0162631 A1 | 7/2007 | Balakrishnan et al. | |
| 2007/0174544 A1 | 7/2007 | Yasuda et al. | |
| 2007/0239944 A1 | 10/2007 | Rupanagunta et al. | |
| 2007/0294697 A1 | 12/2007 | Theimer et al. | |
| 2008/0040519 A1 | 2/2008 | Starr et al. | |
| 2008/0059638 A1 | 3/2008 | Hathorn et al. | |
| 2008/0147889 A1 | 6/2008 | Casper et al. | |
| 2008/0147890 A1 | 6/2008 | Casper et al. | |
| 2008/0183877 A1 | 7/2008 | Carlson et al. | |
| 2008/0235553 A1* | 9/2008 | Chintada et al. | 714/749 |
| 2008/0256264 A1 | 10/2008 | Muto et al. | |
| 2008/0273518 A1* | 11/2008 | Pratt et al. | 370/345 |
| 2008/0307122 A1 | 12/2008 | Butler et al. | |
| 2009/0049241 A1* | 2/2009 | Ohno et al. | 711/114 |
| 2009/0055585 A1* | 2/2009 | Fernandes et al. | 711/114 |
| 2009/0144586 A1 | 6/2009 | Casper et al. | |

| | | | |
|---|---|---|---|
| 2009/0172203 A1 | 7/2009 | Casper et al. | |
| 2009/0210557 A1 | 8/2009 | Gainey, Jr. et al. | |
| 2009/0210559 A1 | 8/2009 | Flanagan et al. | |
| 2009/0210560 A1 | 8/2009 | Yudenfriend et al. | |
| 2009/0210561 A1 | 8/2009 | Ricci et al. | |
| 2009/0210562 A1 | 8/2009 | Huang et al. | |
| 2009/0210563 A1 | 8/2009 | Flanagan et al. | |
| 2009/0210564 A1 | 8/2009 | Ricci et al. | |
| 2009/0210570 A1 | 8/2009 | Bendyk et al. | |
| 2009/0210572 A1 | 8/2009 | Yudenfriend et al. | |
| 2009/0210573 A1 | 8/2009 | Yudenfriend et al. | |
| 2009/0210576 A1 | 8/2009 | Casper et al. | |
| 2009/0210579 A1 | 8/2009 | Bendyk et al. | |
| 2009/0210580 A1 | 8/2009 | Bendyk et al. | |
| 2009/0210581 A1 | 8/2009 | Flanagan et al. | |
| 2009/0210582 A1 | 8/2009 | Bendyk et al. | |
| 2009/0210583 A1 | 8/2009 | Bendyk et al. | |
| 2009/0210584 A1 | 8/2009 | Carlson et al. | |
| 2009/0210585 A1 | 8/2009 | Ricci et al. | |
| 2009/0210768 A1 | 8/2009 | Carlson et al. | |
| 2009/0210769 A1 | 8/2009 | Casper et al. | |
| 2009/0210884 A1 | 8/2009 | Ricci et al. | |
| 2009/0307388 A1 | 12/2009 | Tchapda | |
| 2010/0014526 A1 | 1/2010 | Chavan et al. | |
| 2010/0030919 A1 | 2/2010 | Flanagan et al. | |
| 2010/0030920 A1 | 2/2010 | Casper et al. | |
| 2010/0064072 A1 | 3/2010 | Tang et al. | |
| 2010/0299460 A1* | 11/2010 | Wang .............................. | 710/52 |

FOREIGN PATENT DOCUMENTS

| | | |
|---|---|---|
| GB | 1264096 | 2/1972 |
| GB | 2291990 | 2/1996 |
| JP | 63236152 | 10/1988 |
| JP | 2010-140127 A | 6/2010 |
| WO | WO2006102664 A2 | 9/2006 |

OTHER PUBLICATIONS

Casper, et al.; U.S. Appl. No. 11/548,060; "Facilitating Input/Output Processing by Using Transport Control Words to Reduce Input/Output Communications"; Filed Oct. 16, 2006; Specification having 32 pages and Drawings having 12 sheets.
Casper, et al.; U.S. Appl. No. 11/548,093; "Facilitating Access to Status and Measurement Data Associated with Input/Output Processing"; Filed Oct. 16, 2006; Specification having 33 pages and Drawings having 12 sheets.
Dauby, et al. "Contention Resolution Between Two Processors"; IBM Technical Disclosure Bulletin; vol. 26, No. 10A; Mar. 1984, 3 pages.
DeVeer, J.A.; "Control Frame Multiplexing on Serial I/O Channels"; IBM Technical Disclosure Bulletin; vol. 32, No. 10A; Mar. 1990, pp. 39-40.
Golasky, Richard; "Link-Level Error Recovery with Tape Backup"; Dell Power solutions; Aug. 2005, pp. 88-91.
"IBM® z/Architecture Principles of Operation", Publication No. SA22-7832-05, 6th Edition, Apr. 2007. 1,215 pages separated into 4 electronic attachments.
Peterson, David; "Information Technology, Fibre Channel Protocol for SCSI, Fourth Version (FCP-3)", Draft Proposed American National Standared, Jun. 2004, pp. 1-142.
Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.
Snively, et al.; "Fibre Channel, Framing and Signaling"; (FC-FS) Rev. 1.70; NCITS Working Draft Proposed American National Standard for Information Technology; Feb. 2002; pp. i-575.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
"Information Technology—Fibre Channel Protocol for SCSI, Third Version (FCP-3)," T10 Project 1560-D, Revision 4g, Sep. 13, 2005.
U.S. Appl. No. 12/031,038 Non-Final Office Action dated Nov. 16, 2009.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
Iren, et al.; "The Transport Layer: Tutorial and Survey"; ACM Computing Surveys; vol. 31, No. 4; Dec. 1999; pp. 360-405.
International Search Report and Written Opinion for PCT/EP2009/051447 dated Jul. 1, 2009.
International Search Report and Written Opinion for PCT/EP2009/051483 dated Jul. 27, 2009.
Nordstrom.; "Sequence Reception Method for a Fibre Channel Protocol Chip"; IBM Technical Disclosure Bulletin; vol. 38, No. 12; Dec. 1995; pp. 267-269.
U.S. Appl. No. 11/548,060 Non-Final Office Action dated Apr. 15, 2008.
U.S. Appl. No. 11/548,093 Non-Final Office Action dated Apr. 17, 2008.
"Protocol for Insochronous Traffic Over Fiber Channel Switching"; IBM Technical Disclosure Bulletin; vol. 37, No. 06B; Jun. 1994. pp. 377-380.
Sachs, M.W.; "I/O Marker Changing"; IBM Technical Disclosure Bulletin; vol. 37, No. 02A; Feb. 1994; pp. 75-76.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When The CRC and TCP Checksum Disagree"; SIGCOMM '00, Stockholm, Sweden; Jul. 2000; 10 pages.
U.S. Appl. No. 12/183,315, filed Jul. 31, 2008.
U.S. Appl. No. 12/183,323, filed Jul. 31, 2008.
U.S. Appl. No. 12/183,305, filed Jul. 31, 2008.
"z/Architecture-Principles of Operation," IBM Publication No. SA22-7832-04, 5th Ed., Sep. 2005.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.

U.S. Appl. No. 12/030,967 Restriction Requirement Mailed Dec. 29, 2009.
ANSI INCITS 433-2007, Information Technology Fibre Channel Link Services (FC-LS), Jul. 2007.
Fibre Channel Single Byte Command Code Sets-2 Mapping Protocol (FC-SB-3), T11/Project 1357-D/Rev 1.6, INCITS Mar. 2003.
U.S. Appl. No. 12/030,951 Non-Final Office Action dated May 20, 2010.
U.S. Appl. No. 12/031,038, Non-Final Office Action Mailed Apr. 15, 2010.
U.S. Appl. No. 12/030,975. Final Office Action Mailed May 13, 2010.
U.S. Appl. No. 12/031,023. Final Office Action Mailed Jun. 11, 2010.
U.S. Appl. No. 12/030,967, Notice of Allowance mailed Apr. 23, 2010.
U.S. Appl. No. 12/030,985, Non Final Office Action Mailed May 5, 2010.
U.S. Appl. No. 12/031,042, Non-Final Office Action Mailed Apr. 5, 2010.
U.S. Appl. No. 12/031,021, Notice of Allowance Mailed Apr. 30, 2010.
U.S. Appl. No. 12/183,305, Non-Final Office Action Mailed May 11, 2010.
U.S. Appl. No. 12/183,315 Notice of Allowance dated Jun. 15, 2010.
U.S. Appl. No. 12/030,989 Final Office Action dated May 24, 2010.
SCSI Primary Commands—4 (SPC-4); Project T10/1731-D. Rev 11. INCITS Apr. 14, 2010.
U.S. Appl. No. 12/031,201 Final Office Action dated Jun. 13, 2011.
U.S. Appl. No. 12/946,514, Non-Final Office Action Mailed Jun. 23, 2011.
U.S. Appl. No. 12/183,323, Notice of Allowance Mailed Jun. 23, 2011.
Behrs, JR, "Adaptive Prediction Minimizes Data Overrun and Underrun", IBM, Nov. 1994, pp. 1-3. http://priorartdatabase.com/IPCOM/000114189.
U.S. Appl. No. 12/031,038, Notice of Allowance Mailed Oct. 6, 2010.
Final Office Action for POU920070216US1 U.S. Appl. No. 12/030,912 mailed Oct. 6, 2010.
POU920070217US1_U.S. Appl. No. 12/031,182 Final Office Action Mailed Jul. 22, 2010.
U.S. Appl. No. 12/030,920 Notice of Allowance Mailed Aug. 23, 2010.
U.S. Appl. No. 12/030,932, Final Office Action Mailed Jul. 23, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Final Office Action Mailed Aug. 3, 2010.
U.S. Appl. No. 12/031,042, Final Office Action Mailed Oct. 25, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
IBM, "Method and Apparatus to Monitor PAV Utilization", Feb. 2005, pp. 1-3. http://priorartdatabase.com/IPCOM/000082878.
Moore et al., Reconfiguration of Storage Elements to Improve Performance, IBM, Dec. 1983, pp. 1-3. http://priorartdatabas.com/IPCOM/000047719.
U.S. Appl. No. 12/030,975, Notice of Allowance Mailed Oct. 19, 2010.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/030,932, Non-Final Office Action Mailed Dec. 16, 2010.
U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/183,315, Notice of Allowance Mailed Dec. 13, 2010.
U.S. Appl. No. 12/183,323, Non-Final Office Action Mailed Jan. 3, 2011.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 13/075,993 Non Final Office Action Mailed Aug. 31, 2011.
U.S. Appl. No. 12/030,932, Notice of Allowance mailed Nov. 1, 2011.
U.S. Appl. No. 12/030,981 Non Final Office Action Mailed Aug. 2, 2011.
POU920070218US1,U.S. Appl. No. 12/030,938, Notice of Allowance Mailed Aug. 8, 2011.
POU920080042US1, U.S. Appl. No. 12/030,989, Notice of Allowance Mailed Aug. 5, 2011.
U.S. Appl. No. 12/031,042, Non-Final Office Action Mailed Sep. 30, 2011.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD—Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition Google/H-P; 2001.
POU920070301US1, U.S. Appl. No. 12/030,951, Notice of Allowance Mailed Apr. 4, 2011.
POU920060228US2, U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.

Satran, J.-et al.; Network Working Group; "Internet Small Computer Systems Interface (iSCSI)"; ACM Digital Library; RFC3720; Apr. 2004.

Vaghani, SB.; "Virtual Machine File System"; VMWare Inc./ACM Digital Library; pp. 57-69; 2008-2009.

U.S. Appl. No. 12/030,912, Final Office Action Mailed Feb. 27, 2012.

U.S. Appl. No. 12/031,182 Non-Final Office Action dated Mar., 16, 2012.

U.S. Appl. No. 13/351,073, Non Final Office Action Mailed Mar. 30, 2012.

U.S. Appl. No. 12/031,042, Notice of Allowance Mailed Feb. 29, 2012.

URL, http://en.wikipedia.org/wiki/FICON, FICON, Wikipedia, USA, Wikimedia Foundation, Inc., Aug. 9, 2011.

U.S. Appl. No. 13/024,468, Non Final Office Action Mailed Jan. 26, 2012.

U.S. Appl. No. 13/075,993, Final Office Action Mailed Feb. 13, 2012.

U.S. Appl. No. 12/030,981, Notice of Allowance mailed Jan. 27, 2012.

U.S. Appl. No. 12/030,993 Notice of Allowance Mailed Dec. 22, 2011.

U.S. Appl. No. 13/150,583, Non-Final Office Action Mailed Feb. 3, 2012.

U.S. Appl. No. 13/173,733, Non-Final Office Action Mailed Feb. 7, 2012.

U.S. Appl. No. 13/173,772 Non Final Office Action Mailed Feb. 3, 2012.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,954 Non-Final Office Action dated Jan. 21, 2010.

Written Opinion and International Search Report for PCT/EP2009/051461 dated Sep. 22, 2009.

U.S. Appl. No. 12/031,182 Non-Final Office Action dated Jan. 22, 2010.

U.S. Appl. No. 12/031,201 Non-Final Office Action dated Jan. 25, 2010.

* cited by examiner

PROCESSING OF DATA TO MONITOR INPUT/OUTPUT OPERATIONS

BACKGROUND OF THE INVENTION

1. Field of the Invention

The present disclosure relates generally to input/output processing, and in particular, to determining and/or monitoring the progress of operations associated with input/output processing.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. A response to the command (i.e., a "command response" or CMR) is sent to the channel from the control unit to provide an indication to the channel that the control unit is active and operating, and has received and is executing the command. Further, the channel infers certain information associated with processing the response from the control unit for each command.

Currently, there is no link protocol that allows for determining whether the control unit received the command without requiring a response from the control unit for each command. Typically, current link protocols require that the control unit send a response to each command to indicate that the command is received and the control unit is executing the command. This requirement of a response to each command may compromise performance of the link protocol.

Furthermore, there is no link protocol that allows for monitoring the progress of an I/O operation during the operation to allow for early detection of problems.

Accordingly, there is a need in the art for systems and methods to allow for the channel to determine whether a command has been received without the need for a response to each command, and to allow the channel to monitor the progress of an I/O operation.

BRIEF SUMMARY OF THE INVENTION

Embodiments of the invention include a computer program product for processing communications between a control unit and a channel subsystem in an input/output processing system. The computer program product includes a tangible storage medium readable by a processing circuit and storing instructions for execution by the processing circuit for performing a method. The method includes: sending a command from the channel subsystem to the control unit to initiate an input/output operation; setting a time period for completion of the operation; and responsive to the operation not completing within the time period, sending a message to determine whether the control unit has an exchange open for the command.

Additional embodiments include an apparatus for processing communications in an input/output processing system. The apparatus includes a channel subsystem of a host computer system configured for communication with a control unit capable of commanding and determining status of an I/O device. The channel subsystem performs: sending a command to the control unit to initiate an input/output operation; setting a time period for completion of the operation; and responsive to the operation not completing within the time period, sending a message to determine whether the control unit has an exchange open for the command.

Further embodiments include a method of processing communications between a control unit and a channel subsystem in an input/output processing system. The method includes: sending a command from the channel subsystem to the control unit to initiate an input/output operation; setting a time period for completion of the operation; and responsive to the operation not completing within the time period, sending a message to determine whether the control unit has an exchange open for the command.

Other apparatuses, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
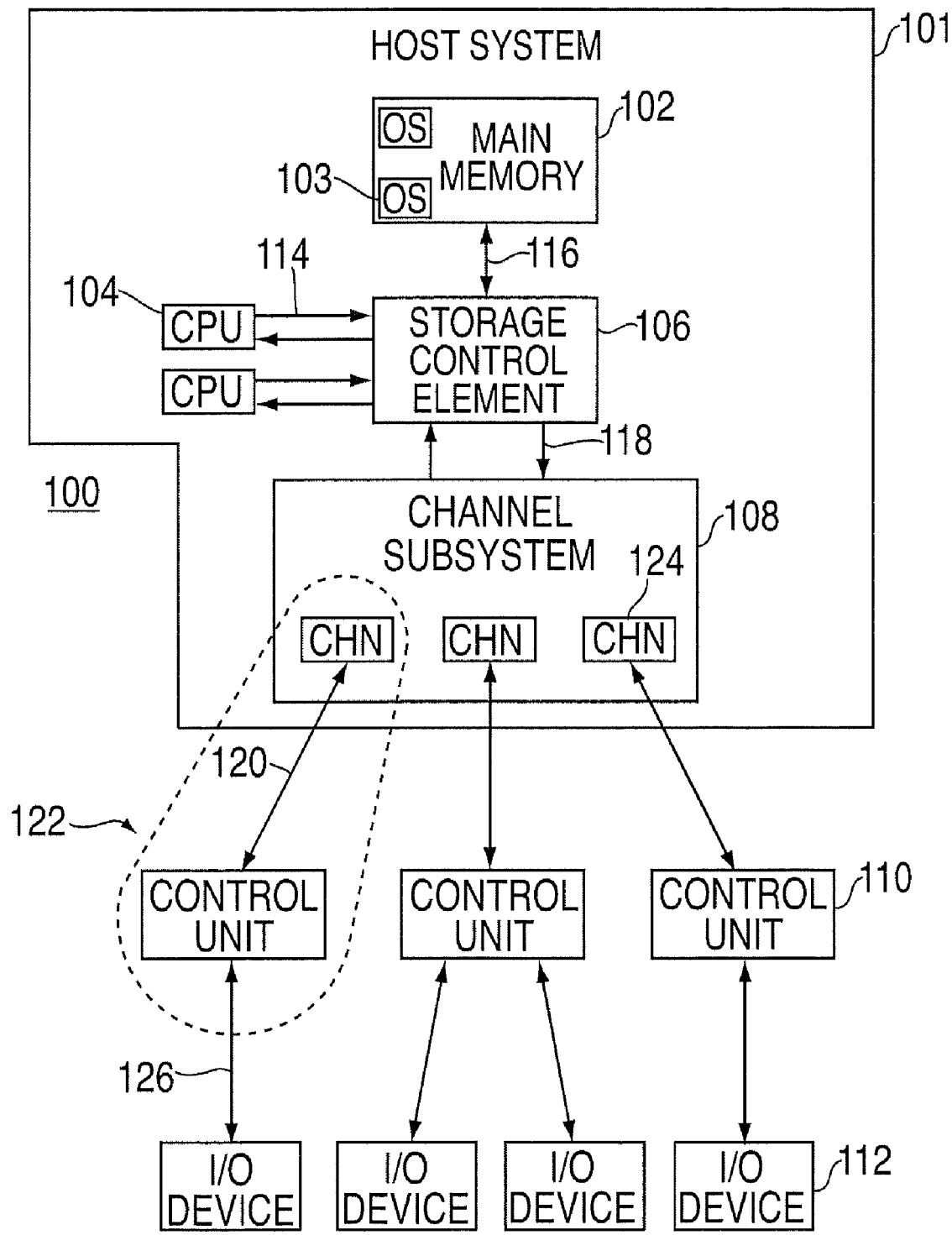
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling processing of information between a channel and a control unit. I/O processing is facilitated, in one example, by providing a system and method for determining whether the control unit has an exchange open for a command and/or monitoring the progress of an I/O operation. As referred to herein, "monitoring" may encompass sending one or more messages to the control unit to determine whether the control unit has an exchange open for a command and/or to determine whether an I/O operation is pending or proceeding at the control unit. In an exemplary embodiment, the one or more messages are Extended Link Service (ELS) Read Exchange Concise (REC) messages.

In one exemplary embodiment, the channel includes one or more commands in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed by the control unit rather than the I/O communications adapter.

In an exemplary embodiment, the control unit generates a response message in response to executing the channel program. The control unit may also generate a response message without executing the channel program under a limited number of communication scenarios, e.g., to inform the I/O communications adapter that the channel program will not be executed. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting information, and performs further operations using the extracted information.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more 110 devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
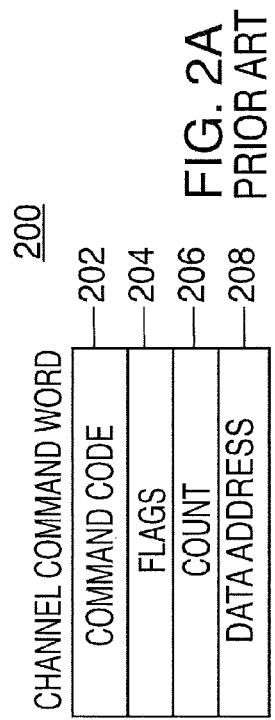
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subcha'nnel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220.

Figure 2B:
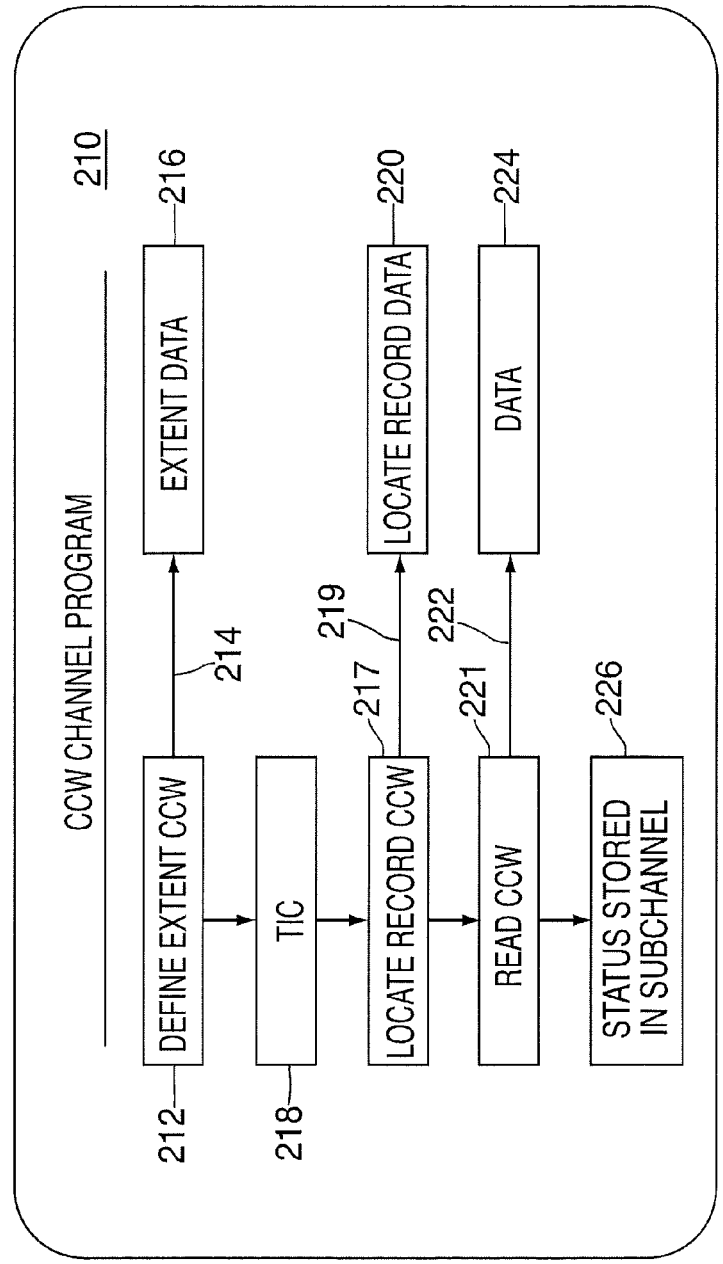
FIG. 2B depicts one example of a prior art channel command word channel program.
Figure 3:
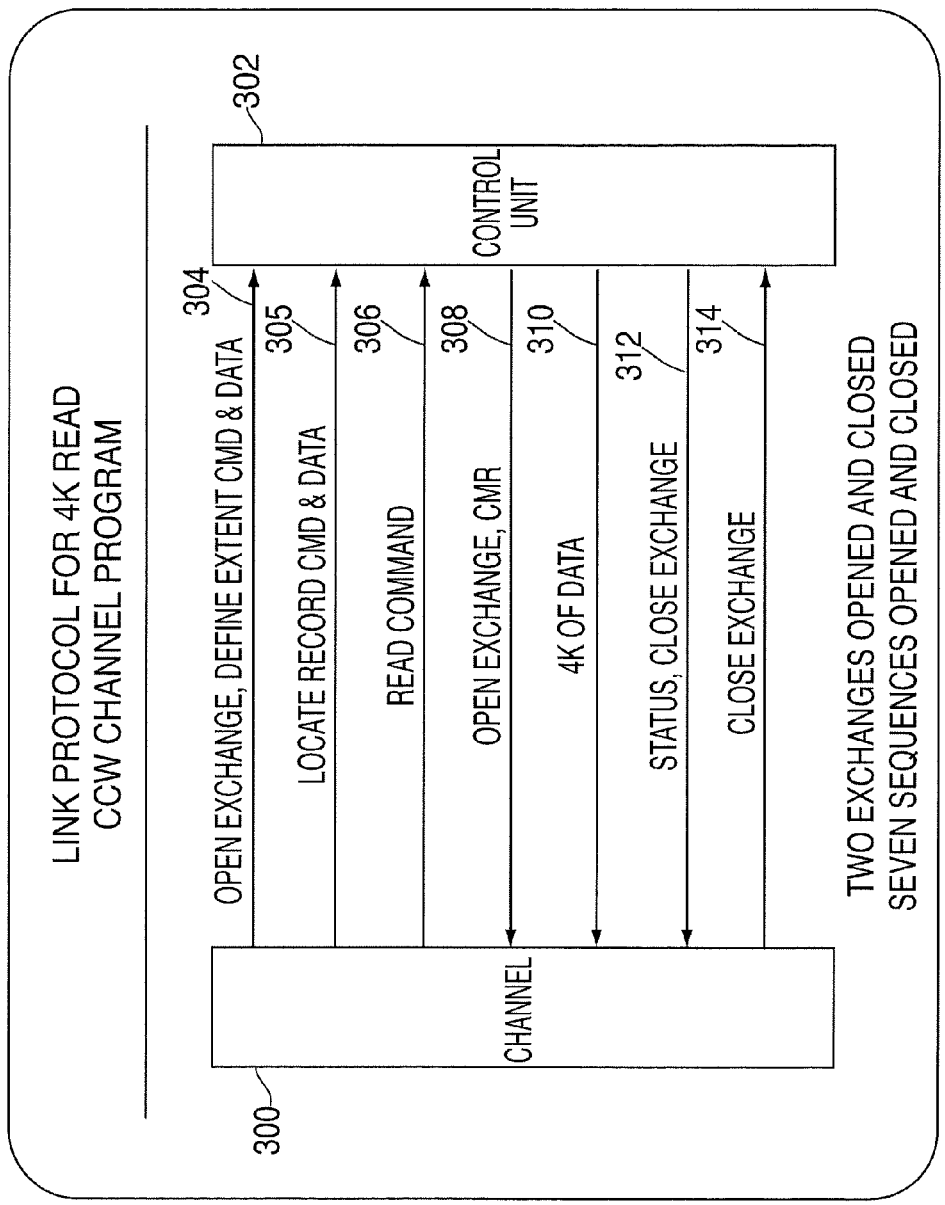
FIG. 3 depicts one embodiment of a prior art link protocol used in communicating between a channel and control unit to execute the channel command word channel program of FIG. 2B.

The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

The FCP defines the following terms, as recited in "Information Technology—Fibre Channel Protocol for SCSI, Third Version (FCP-3)", pages 3-5:
N_Port: A hardware entity that supports the FC-FS-2 FC-2 layer. It may act as an Originator, a Responder, or both;
Originator: The logical function associated with an N_Port responsible for originating an Exchange;
Responder: The logical function in an N_Port responsible for supporting the Exchange initiated by the Originator in another N_Port;
Exchange: The basic mechanism that transfers information consisting of one or more related nonconcurrent Sequences that may flow in the same or opposite directions. The Exchange is identified by an Originator Exchange_ID (OX_ID) and a Responder Exchange_Identifier (RX_ID);
Sequence: A set of one or more Data frames with a common Sequence_ID (SEQ_ID), transmitted unidirectionally from one N_Port to another N_Port with a corresponding response, if applicable, transmitted in response to each Data frame; and
FCP_Port: An N_Port or NL_Port that supports the SCSI Fibre Channel Protocol.

Fibre Channel (FC) is logically a point-to-point serial data channel. The Fibre Channel Physical layer (FC-2 layer) described by FC-FS-2 performs those functions required to transfer data from one N_Port or NL_Port to another. An FC-4 mapping layer uses the services provided by FC-FS-2 to perform the functions defined by the FC-4. The protocol is described in terms of the stream of FC IUs and Exchanges generated by a pair of FCP_Ports that support the FC-4. The I/O operation defined by SAM-3 is mapped into a Fibre Channel Exchange. A Fibre Channel Exchange carrying information for a SCSI I/O operation is an FCP Exchange. The request and response primitives of an I/O operation are mapped into Information Units (IUs) as shown in table 1.

TABLE 1

| SCSI and Fibre Channel Protocol functions | |
| --- | --- |
| SCSI function | FCP equivalent |
| I/O operation | Exchange |
| Protocol Service request and response | Sequence |

TABLE 1-continued

| SCSI and Fibre Channel Protocol functions | |
| --- | --- |
| SCSI function | FCP equivalent |
| Send SCSI Command request | Unsolicited command IU (FCP_CMND) |
| Data delivery request | Data descriptor IU (FCP_XFER_RDY) |
| Data delivery action | Solicited data IU (FCP_DATA) |
| Send Command Complete response | Command status IU (FCP_RSP) |
| REQ/ACK for Command Complete | Confirmation IU (FCP_CONF) |

An application client begins an FCP I/O operation when it invokes a Send SCSI Command SCSI transport protocol service request or a Send Task Management Request SCSI transport protocol service request (see SAM-3). The Send SCSI Command SCSI transport protocol service request conveys a single request or a list of linked requests from the application client to the FCP service delivery subsystem. Each request contains all the information necessary for the processing of one SCSI command or task management function, including the local storage address and characteristics of data. The Fibre Channel Protocol then performs the following actions using FC-FS-2 services to perform the SCSI command or task management function. (FCP-3, p. 10)

The FCP_Port that is the initiator for the command starts an Exchange by sending an unsolicited command IU containing the FCP_CMND IU payload, including some command controls, addressing information, and the SCSI command descriptor block (CDB). The initiator FCP_Port sends the FCP_CMND IU payload to invoke the Send SCSI Command SCSI transport protocol service request (see SAM-3) and start the FCP I/O operation. The Exchange that is started is identified by its fully qualified exchange identifier (FQXID) during the remainder of the FCP I/O operation and is used only for the IUs associated with that FCP I/O operation. (FCP-3, p. 10)

After all the data has been transferred, the device server transmits the Send Command Complete protocol service response (described in SAM-3) by requesting the transmission of an IU containing the FCP_RSP IU payload. That payload contains the SCSI status and, if the SCSI status is CHECK CONDITION, the autosense data describing the condition. The FCP_RSP IU indicates completion of the SCSI command. If no command linking, error recovery, or confirmed completion is requested, the FCP_RSP IU is the final sequence of the Exchange. The device server determines whether additional linked commands are to be performed in the FCP I/O operation. If this is the last or only command processed in the FCP I/O operation, the FCP I/O operation and the Exchange are terminated. (FCP-3, p. 11)

Figure 5:
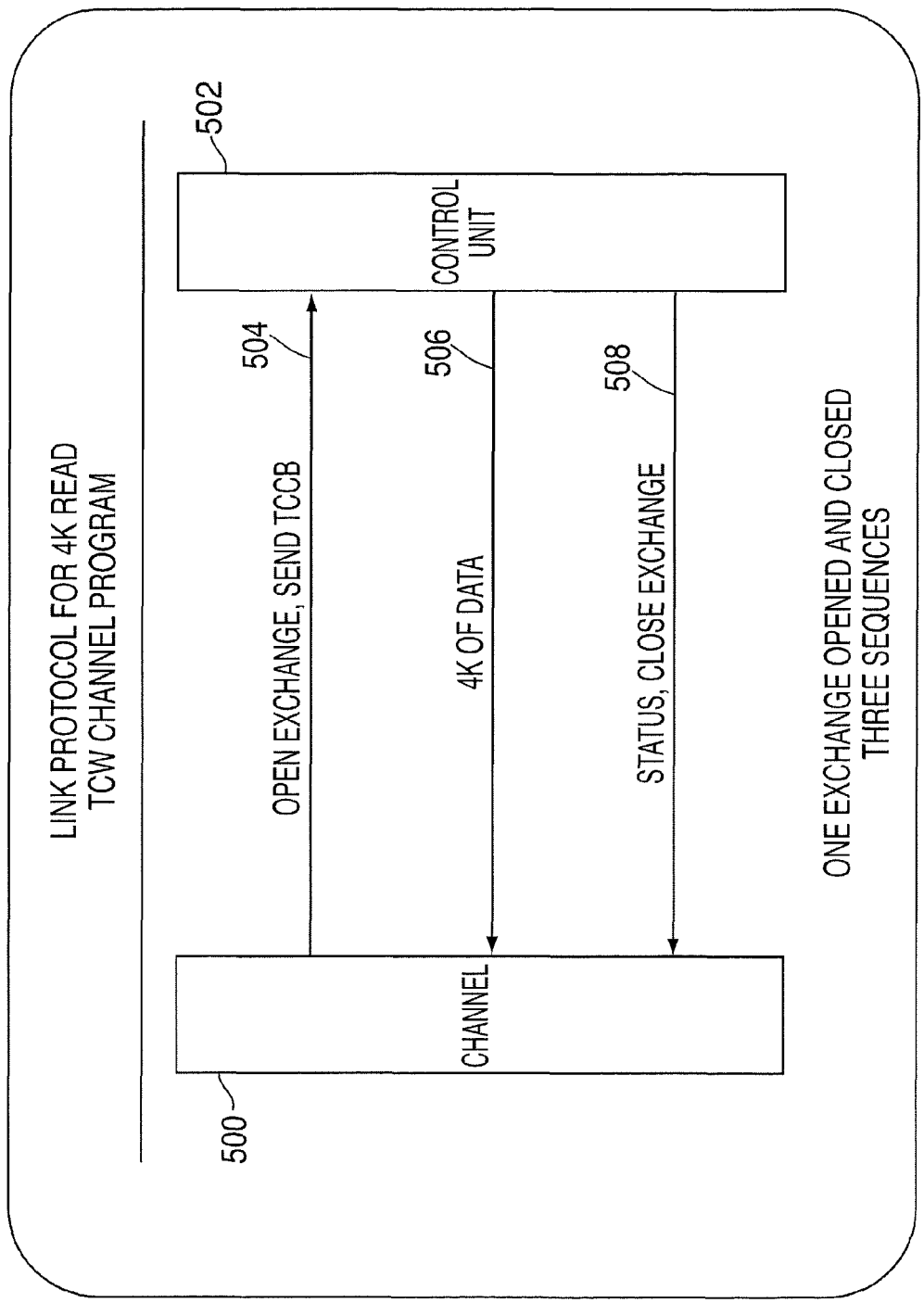
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information, including parameters that support the calculation of extended measurement words and notify the channel 500 of the maximum number of open exchanges supported by the control unit 502.

In a further example, to write 4k of customer data, the channel 500 uses the FCP link protocol phases, as follows:
1. Transfer a TCCB in the FCP_CMND IU.
2. Transfer the IU of data, and sequence initiative to the control unit 502.
3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 4:
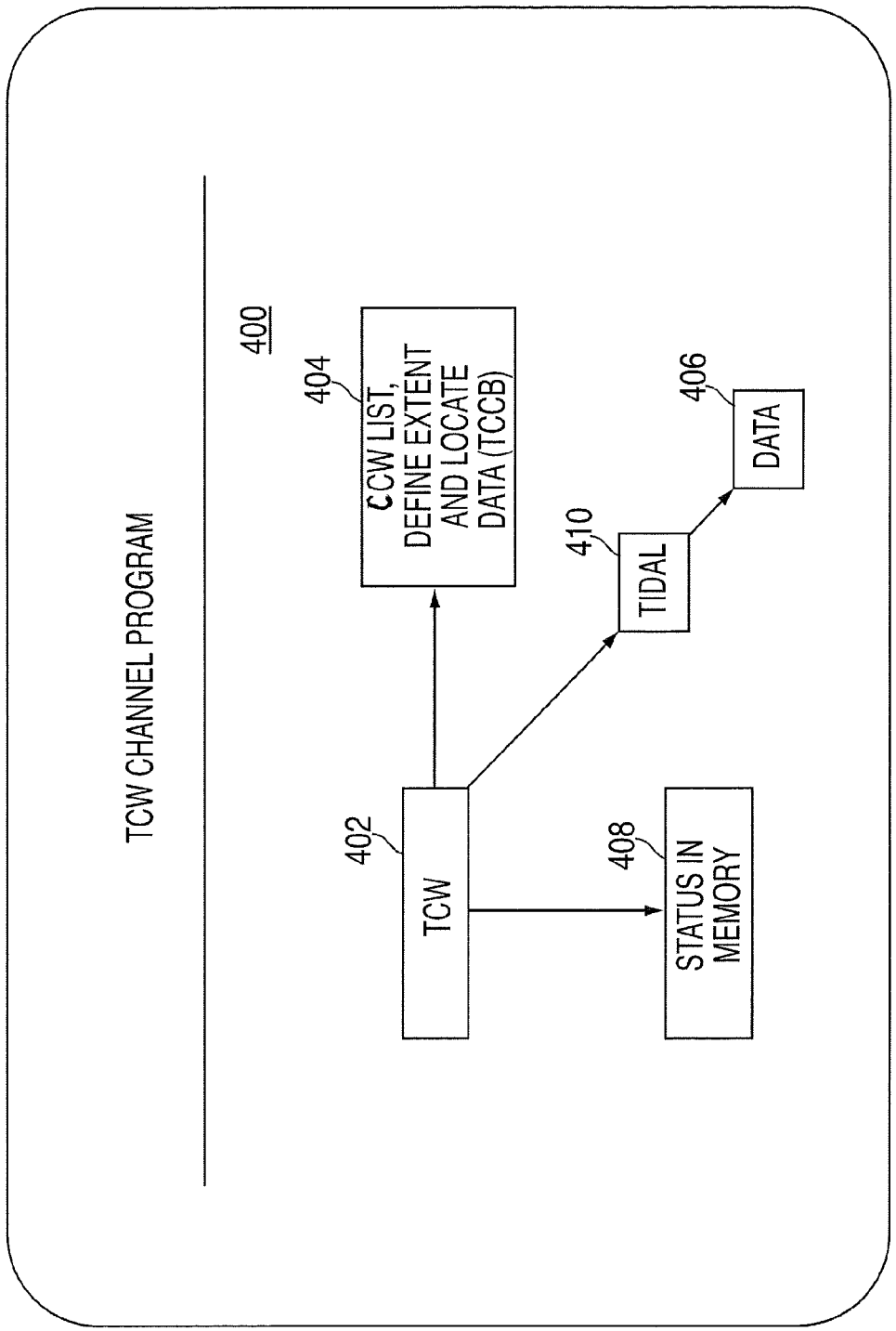
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 6:
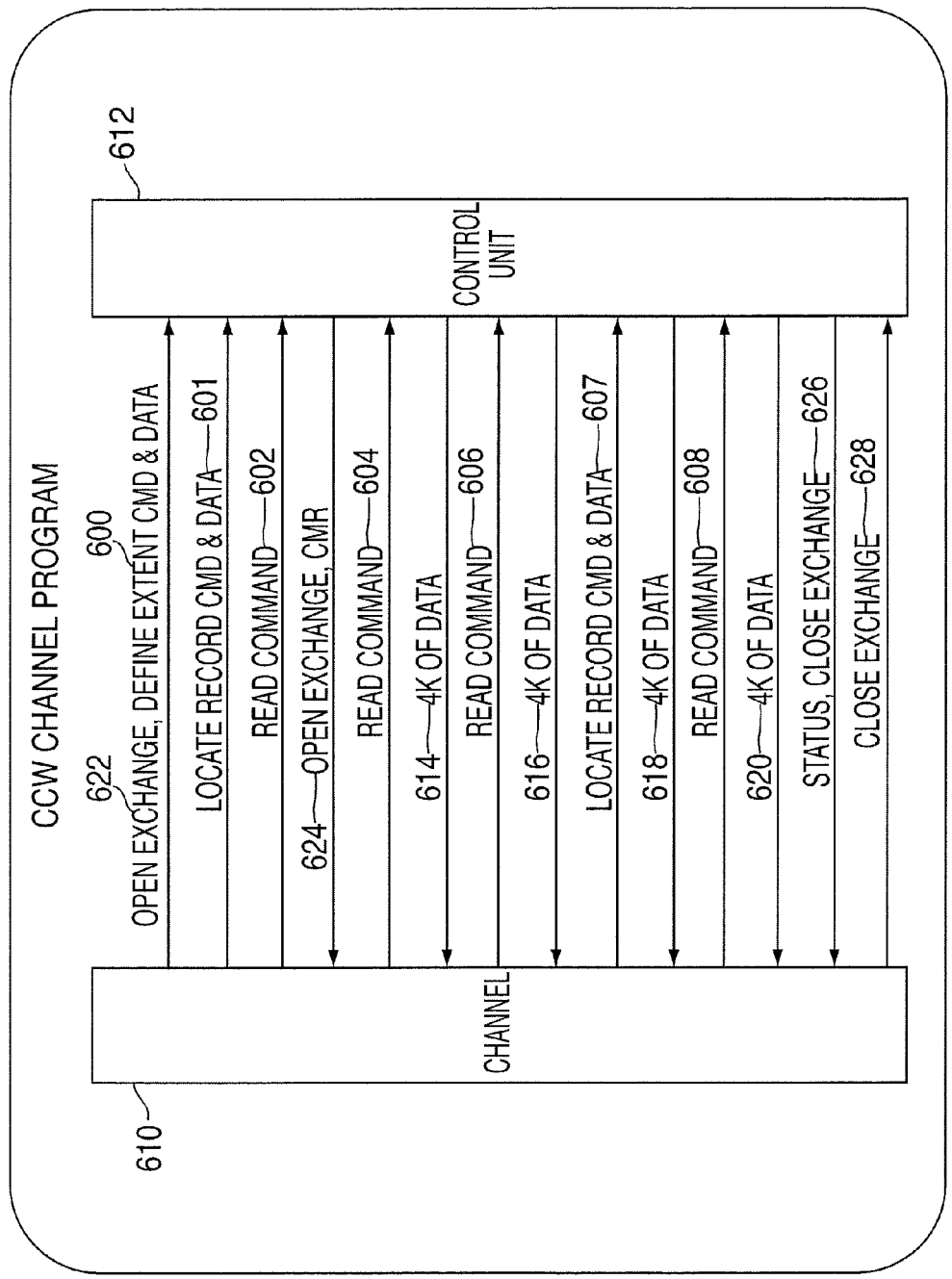
FIG. 6 depicts one embodiment of a prior art link protocol used to communicate between a channel and control unit in order to execute four read commands of a channel command word channel program.
Figure 7:
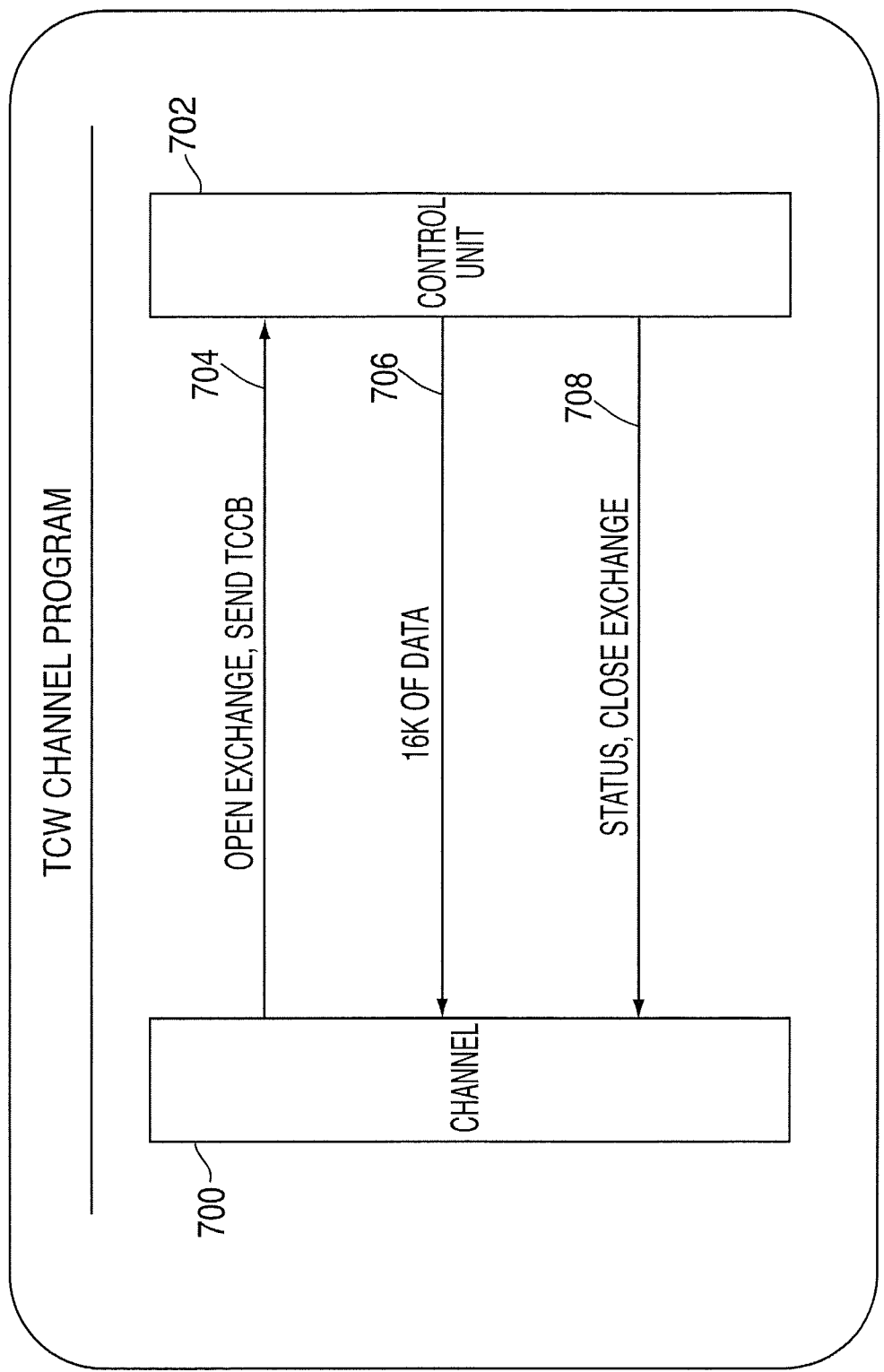
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16k of data 706 to the channel 700. Additionally, the control unit 702 provides status to the channel 700 and closes the exchange 708. Thus, the TCW channel program requires much less communications to transfer the same amount of data as the CCW channel program of FIG. 6.

In an exemplary embodiment, the CCW channel program of FIG. 6 is implemented using a protocol that supports Channel Command Words, for example, a Fibre Connectivity (FICON) protocol. Links operating under this protocol may be referred to as being in a "Command Mode".

In an exemplary embodiment, the TCW channel program of FIG. 7 is implemented using a protocol to execute Device Control Words, which are transferred using a link protocol referred to as a "Transport Mode" protocol.

Figure 8:
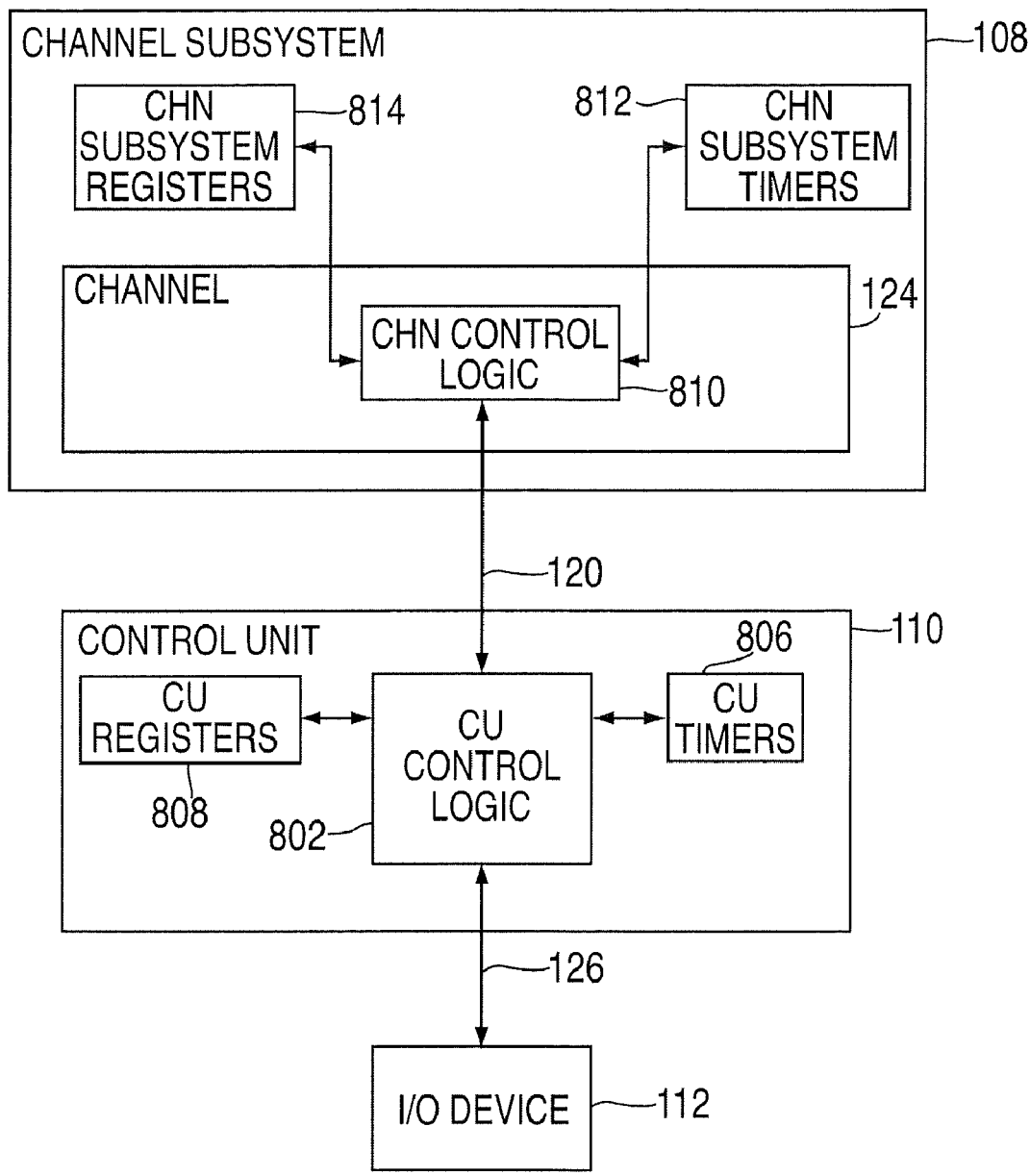
FIG. 8 depicts one embodiment of a control unit and a channel, in accordance with an aspect of the present invention.

Turning now to FIG. 8, one embodiment of the control unit 110 and the channel 124 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, as well as receives status information and other feedback from the I/O device 112.

The CU control logic 802 can access and control other elements within the control unit 110, such as CU timers 806 and CU registers 808. The CU timers 806 may include multiple timer functions to establish wait time periods, such as those time periods set by the channel 124 for completion of an I/O operation. The CU timers 806 may further include one or more countdown timers to monitor and abort I/O operations and commands, including messages such as REC messages, that do not complete within a predetermined period. The CU registers 808 can include fixed values that provide configuration and status information, as well as dynamic status information that is updated as commands are executed by the CU control logic 802. The control unit 110 may further include other buffer or memory elements (not depicted) to store multiple messages or status information associated with communications between the channel 124 and the I/O device 112.

The channel 124 in the channel subsystem 108 includes multiple elements to support communication with the control unit 110. For example, the channel 124 may include CHN control logic 810 that interfaces with CHN subsystem timers 812 and CHN subsystem registers 814. In an exemplary embodiment, the CHN control logic 810 controls communication between the channel subsystem 108 and the control unit 110. The CHN control logic 810 may directly interface to the CU control logic 802 via the connection 120 to send commands and receive responses, such as transport command and response IUs. Alternatively, messaging interfaces and/or buffers (not depicted) can be placed between the CHN control logic 810 and the CU control logic 802. The CHN subsystem timers 812 may include multiple timer functions to, for example, establish wait or delay time periods. The CHN subsystem timers 812 may further include one or more countdown timers to monitor and abort command sequences that do not complete within a predetermined period. The CHN subsystem registers 814 can include fixed values that provide configuration and status information, as well as dynamic status information, updated as commands are transported and responses are received.

Referring again to FIG. 1, in some exemplary embodiments, the control unit 110 and the channel 124 of FIG. 1 may operate in different modes, i.e., use different protocols. For example, the channel 124 may operate in the Transport Mode and utilize the transport mode protocol, and the control unit 110 may operate in the Command Mode and utilize the FICON protocol. The control unit 110 and the channel 124 may each support the Command Mode and/or the Transport Mode.

In one exemplary embodiment, there is provided a system and method to determine whether the control unit 110 has received a command, and to determine whether an I/O operation is proceeding or whether the I/O operation has terminated or the command was lost. In an exemplary embodiment, the channel 124, in the absence of an indication that the I/O operation is complete, sends a message to the control unit 110 to determine whether the command was received by the control unit 110. In an exemplary embodiment, the message is a Read Exchange Concise (REC) message. A REC message may be used by the channel 124 to interrogate the control unit 110 to determine whether the control unit 110 has received the command. In another exemplary embodiment, the control unit 110 and the channel 124 exchange messages in the transport mode.

The channel 124 may receive a response to the message, such as a REC response, that indicates whether the control unit 110 has received the command. The REC message queries whether the control unit 110 has received the command on an opened exchange, and the REC response indicates whether the exchange is open. The REC commands and responses are extended link service (ELS) messages.

The embodiments described herein allow the transport mode to avoid the requirement of a response that confirms that the control unit 110 received a command, referred to herein as a "command response" or "CMR". Previous protocols, including the command mode protocol, require a CMR to be sent from the control unit 110 in response to each command or set of commands. The present embodiments, on the contrary, need not require a CMR for each command. Instead, the embodiments allow the channel 124 to set a timer, for example in the CI-IN subsystem timers 812 of FIG. 8, for receiving an indication that the I/O operation is complete. Only if the timer runs out does the channel 124 send the REC message to the control unit 110. Thus, the number of messages needed between the control unit 110 and the channel 124 may be reduced. Additional timer periods can be used to monitor response time to the REC message, subsequent REC messages, and a response to the command following an REC response message.

Figure 9:
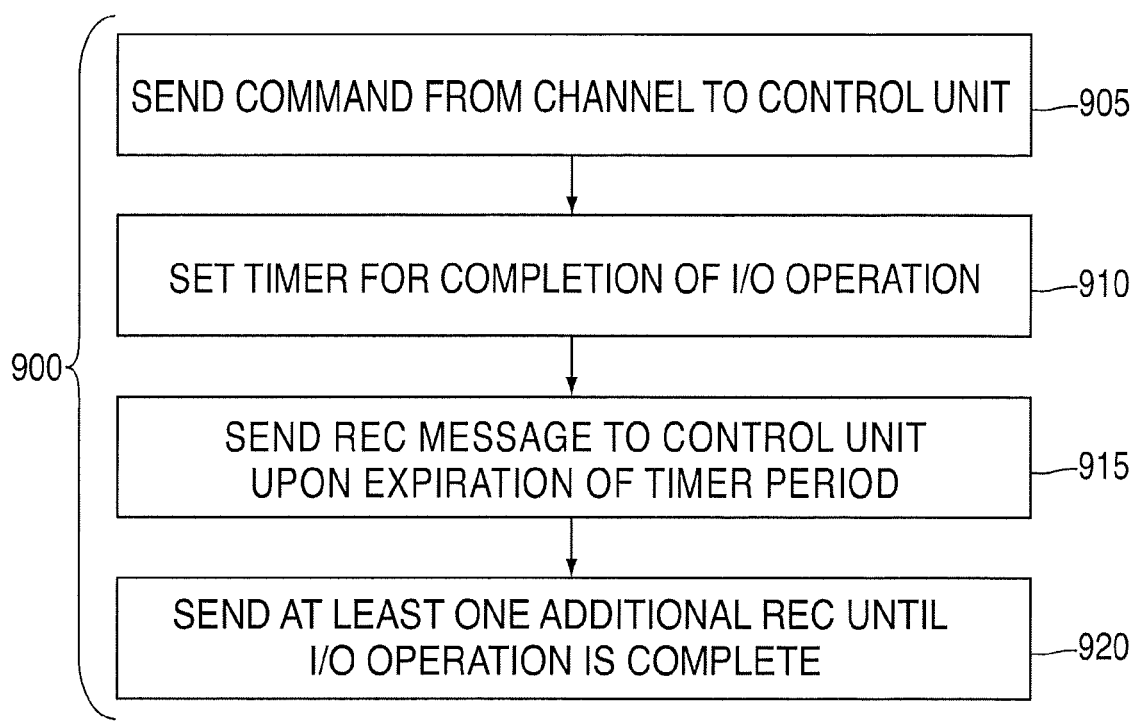
FIG. 9 depicts one embodiment of a process for determining whether a control unit has an exchange open for a command and/or monitoring the progress of an I/O operation.

Turning now to FIG. 9, a process 900 for monitoring a control unit 110 of an I/O processing system will now be described in accordance with exemplary embodiments, and in reference to the I/O processing system 100 of FIG. 1.

At block 905, the channel 124 sends a command to the control unit 110 to initiate an I/O operation. In an exemplary embodiment, the command is in transport mode. The I/O operation may be, for example, a read operation or a write operation.

At block 910, the channel 124 sets a timer for completion of the I/O operation. The timer may be set for a completion time period, or a period of time for completion of the I/O operation.

At block 915, if the I/O operation has not been completed, i.e., the channel 124 has not received any notification that the I/O operation has been completed, the channel 124 sends a message to the control unit 110 to determine whether the control unit 110 has received the command. If the control unit 110 has not received the command, the channel 124 may abort the I/O operation. In one exemplary embodiment, this message is a REC message.

At block 920, if the control unit 110 indicates that the command has been received, the channel 124 sets a second timer, for example in the CI-IN subsystem timers 812 of FIG. 8. If the I/O operation has not completed at the expiration of the second time period, the channel 124 sends at least one additional REC message. In one embodiment, the channel 124 periodically sends the additional REC message to the control unit 110 until it receives an indication that the I/O operation has been completed. In one embodiment, the indication is in the form of a response from the control unit 110 indicating the I/O operation is complete.

Figure 10:
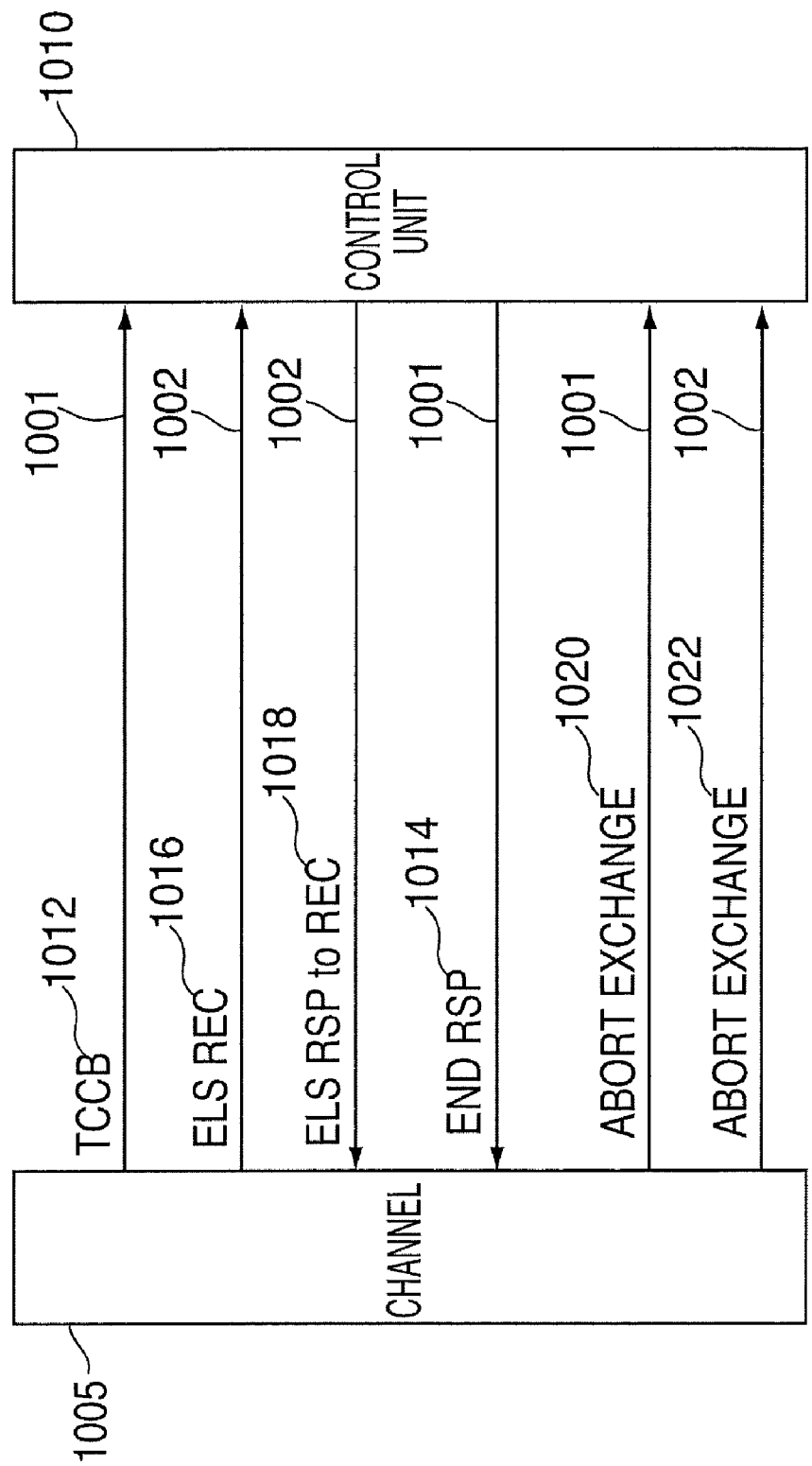
FIG. 10 depicts one embodiment of a link protocol used to communicate between a channel and a control unit to determine whether a control unit has an exchange open for a command and/or monitor the progress of an I/O operation.

In the following example, a procedure for monitoring an I/O operation is illustrated with reference to FIG. 10. The link level protocol used for the communications described in this example (not including the IU message content) is, for instance, Fibre Channel Protocol (FCP). The procedure includes one or more of the following phases:

1. A channel 1005, which is operating in transport mode, sends a Transport Command IU 1012 that contains the TCCB, using the transport mode protocol, to a control unit 1010. The Transport Command IU 1012 may also be referred to as a "TCCB IU". The TCCB IU 1012 causes the control unit 1010 to initiate a specified I/O operation. In sending the TCCB IU 1012, the channel 1005 may open an exchange 1001 and transfer initiative to the control unit 1010.

2. The channel 1005 may enable a timer (i.e., "completion timer") for completion of the I/O operation. In one example, the completion timer may be set to a time period such as between one (1) and twenty (20) seconds. The specific time periods described are merely exemplary. Any time period for the completion timer may be used. In one embodiment, the time period set in the completion timer is based on an amount of time that is expected for the I/O operation to complete. In one exemplary embodiment, the completion timer is based on a nominal or maximum amount of time for completion.

3. If the channel 1005 receives a message, described herein as a Transport Command completion response, or "ending response" 1014 (shown as END RSP IU 1014 in FIG. 10), no further action is required. END RSP IU 1014 provides an indication from the control unit 1010 that the I/O operation has been successfully completed. In one example, the END RSP IU 1014 is the Status, Close Exchange 508 of FIG. 5.

4. If the channel 1005 does not receive the END RSP IU 1014 from the control unit 1010 within the time period set by the completion timer, the channel 1005 sends an ELS REC message 1016 to determine if the control unit 1010 has received the TCCB IU 1012 that opened the exchange 1001. In sending the REC message 1016, the channel 1005 may open an exchange 1002 and transfer initiative to the control unit 1010.

Optionally, the channel 1005 may start a timer (i.e., an "REC timer") for response to the REC message. For example, the REC timer may be set to a time period such as between two (2) and five (5) seconds. The specific time periods described are merely exemplary. Any time period for the completion timer may be used.

If a response, referred to as an "REC response" 1018 or "ELS RESP to REC" 1018, is not received by the channel 1005 for the REC message 1016 in the time period set by the REC timer, the channel 1005 aborts both the interrogated exchange 1001 and the exchange the REC message was sent on, e.g., exchange 1002, such as by performing abort exchange sequences 1020 and 1022. The channel 1005 stores channel (or subchannel) status associated with the exchange 1001 to alert the software, for example, that the subchannel is primary, secondary and alert status pending with an interface control check (IFCC).

If the I/O operation that the REC interrogated completes before the REC timer expires or the REC response IU 1018 is sent, then the channel (or subchannel) status is stored with status received in the END RSP 1014 and the state information from the REC operation, when it completes, is discarded by the channel 1005.

5. The channel 1005 receives the REC response IU 1018 from the control unit 1010 that closes the exchange 1002. If the REC response IU 1018 sent from the control unit 1010 indicates that the control unit 1010 knows about the exchange 1001, i.e., has received the TCCB IU 1012, the channel 1005 may send additional REC messages 1016 to the control unit 1010. In one exemplary embodiment, the channel 1005 sends one or more additional REC messages 1016 periodically until the I/O operation is complete. The channel 1005 may set an additional timer for sending additional REC messages. For example, the additional timer may be set at between five (5) and sixty (60) seconds.

In one exemplary embodiment, periodically sending additional REC messages includes sending an additional REC message 1016, and setting the additional timer period for completion of the I/O operation. Upon expiration of the additional timer period, if the I/O operation is not complete, the channel 1005 sends another additional REC message 1016. This process is repeated until the I/O operation is complete or an indication is received from the control unit 1010 that the control unit 1010 does not "have" the command. An indication that the control unit 1010 does not have the command may be a result of the command having been lost, the exchange having been lost or closed, or the I/O operation having been otherwise stopped or terminated. In one exemplary embodiment, the completion timer may be for a first time period, to ensure that the I/O operation has been initiated, and the additional timer may be for a second longer time period, to allow the channel 1005 to periodically check the status of the I/O operation.

6. If at any time the control unit 1010, in response to the REC message 1016 or additional REC message(s) 1016, indicates via the REC Response 1018 that it does not know about the exchange 1001 being interrogated, the channel 1005 may then wait a selected duration (e.g., 100 ms), and thereafter perform abort sequence 1020 to abort exchange 1001. The channel 1005 may also store the channel (or subchannel) status to alert the software, for example, that the subchannel is primary, secondary and alert status pending with an interface control check (IFCC). If the END RSP IU 1014 arrives at the channel 1005 during this duration, then the I/O operation has completed successfully and no error is reported. This selected time duration allows for the case where the REC response 1018 is sent after the END RSP IU 1014 from the control unit 1010 to the channel 1005 with the message that the exchange being interrogated is not open, but the REC response 1018 passed the END RSP IU 1014 on its way to the channel 1005 on the connection or link 120. The channel 1005 thus waits this time duration to determine whether the END RSP IU 1014 is on its way and will be received.

The naming and numbering conventions described in the above examples are exemplary and provided to illustrate the method described herein. The naming and number convention provided is arbitrarily chosen, and is provided for explanation only. Furthermore, the protocols, information units sent from the channel 1005 and control unit 1010, and specific messages described in the above examples are exemplary. Any suitable I/O protocols and associated messages may be processed as described herein.

Technical effects of exemplary embodiments include the ability of the channel subsystem to monitor the progress and status of I/O operations without requiring a CMR from the control unit in response to each command. Other technical effects include the ability of the channel subsystem to periodically monitor the 110 operation and time the operation, as well as quickly detect any problems or loss of the operation.

The systems and methods described herein provide numerous advantages, in that they provide an effective protocol that allows for the operation to be monitored without the need for CMRs, and provides a way to time operations and detect problems.

In an exemplary embodiment, the REC message is only executed when the channel has timed out an I/O operation, thereby removing the requirement for a CMR on every I/O operation. Removing the requirement for the CMR on every I/O operation improves the system performance, while at the same time, by using the REC message when the channel times out, provides for the early detection of a lost command or response IU.

In prior art FICON protocols, for example, when the channel receives the CMR frame from the control unit the channel no longer times the operation. Pursuant to the exemplary embodiments herein, the channel continues to re-send the REC after every time-out period (after the first REC and/or additional REC time-out periods) to see if the operation is still pending or proceeding at the control unit or if some error occurred that caused the Ending Response IU for the operation to be lost. In this way, the REC message provides for the early detection of either a lost command or response IU.

The systems and methods described herein overcome the disadvantages and provide the advantages described above.

Figure 11:
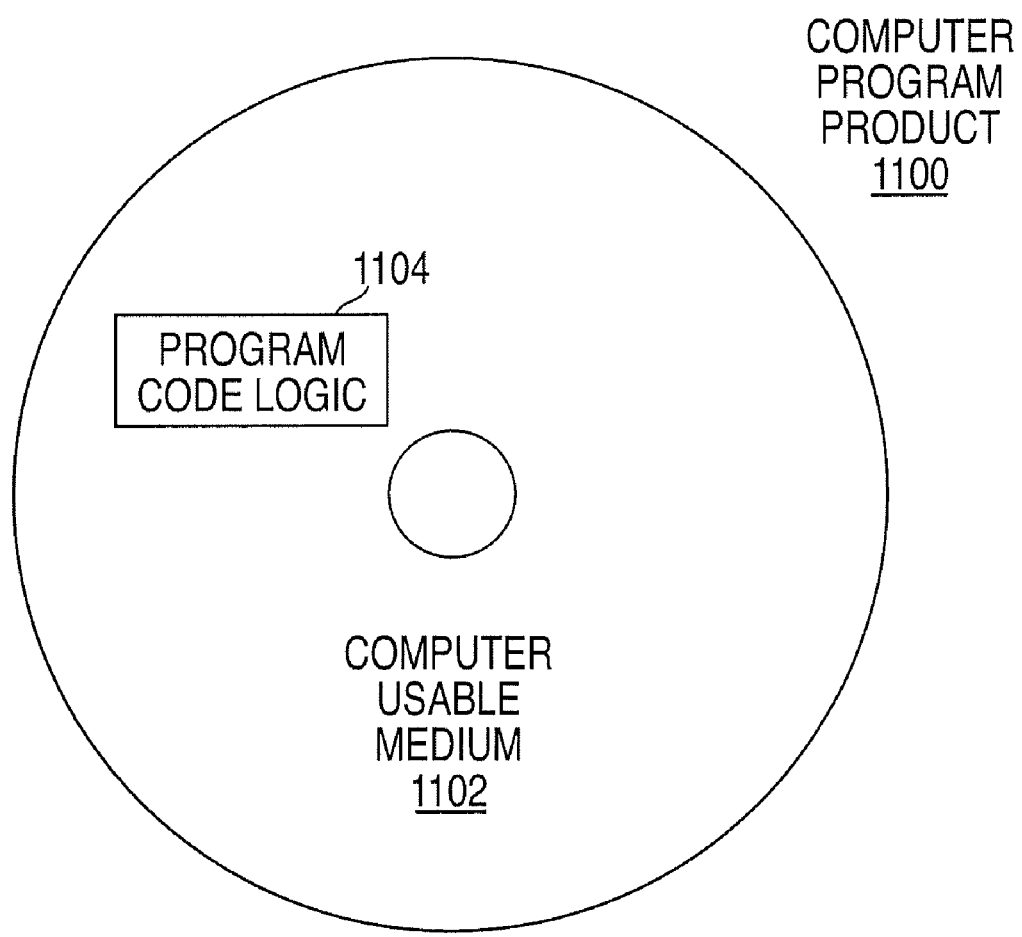
FIG. 11 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1100 as depicted in FIG. 11 on a computer usable medium 1102 with computer program code logic 1104 containing instructions embodied in tangible media as an article of manufacture. Exemplary articles of manufacture for computer usable medium 1102 may include floppy diskettes, CD-ROMs, hard drives, universal serial bus (USB) flash drives, or any other computer-readable storage medium, wherein, when the computer program code logic 1104 is loaded into and executed by a computer, the computer becomes an apparatus for practicing the invention. Embodiments include computer program code logic 1104, for example, whether stored in a storage medium, loaded into and/or executed by a computer, or transmitted over some transmission medium, such as over electrical wiring or cabling, through fiber optics, or via electromagnetic radiation, wherein, when the computer program code logic 1104 is loaded into and executed by a computer, the computer becomes an apparatus for practicing the invention. When implemented on a general-purpose microprocessor, the computer program code logic 1104 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for processing communications between a control unit and a channel subsystem in an input/output processing system, comprising a non-transitory tangible storage medium readable by a processing circuit and storing instructions for execution by the processing circuit for performing a method comprising:

sending a command from the channel subsystem to the control unit to initiate an input/output operation, the sending of the command for opening a first exchange with the control unit, the first exchange identified by a first identifier, the command including a transport command control block (TCCB), the TCCB including at least one device control word (DCW) and the TCCB being obtained by a location identified by a transport control word (TCW);

setting a time period for completion of the input/output operation; and based on the input/output operation not completing within the time period, sending a message to determine whether the control unit has the first exchange, identified by the first identifier, open for the command, the sending of the message for opening a second exchange, the second exchange identified by a second identifier, wherein the message interrogates the control unit to determine whether the control unit has received the command.

2. The computer program product of claim 1, wherein the message is a Read Exchange Concise (REC) message.

3. The computer program product of claim 1, wherein completion of the operation comprises receiving a completion message from the control unit indicating that the operation is complete.

4. The computer program product of claim 1, further comprising:

receiving a response to the message, the response indicating whether the control unit has the first exchange, identified by the first identifier, open for the command; and based on the response indicating that the control unit has the first exchange open for the command, re-sending the message in an exchange to the control unit after an additional time period.

5. The computer program product of claim 1, further comprising:

receiving a response to the message, the response indicating whether the control unit has the first exchange, identified by the first identifier, open for the command; and based on the response indicating that the control unit has no first exchange open for the command, aborting the input/output operation.

6. The computer program product of claim 1, wherein sending the message comprises periodically sending the message until one of: i) completion of the operation, and ii) receipt of a response to the message indicating that the control unit does not have the exchange open for the command.

7. The computer program product of claim 6, wherein periodically sending the message comprises:

sending the message to the control unit upon expiration of the time period;

receiving a response from the control unit indicating that the control unit has the exchange open for the command;

setting an additional time period for completion of the operation; and re-sending the message upon expiration of the additional time period to determine whether the control unit is continuing to execute the operation.

8. The computer program product of claim 1, wherein:

the time period is a first time period for receiving a completion message from the control unit indicating that the operation is complete;

the message is a Read Exchange Concise (REC) message, and sending the message is based on not receiving the completion message within the first time period; and the method further comprises:

receiving a response to the REC message, the response indicating whether the control unit has the exchange open for the command;

based on the response indicating that the control unit has the exchange open for the command, setting a second time period for completion of the operation; and re-sending the REC message upon expiration of the additional time period to determine whether the control unit is continuing to execute the operation.

9. An apparatus for processing communications in an input/output processing system, comprising:

a channel subsystem of a host computer system configured for communication with a control unit capable of commanding and determining status of an I/O device, the channel subsystem performing:

sending a command to the control unit to initiate an input/output operation, the sending of the command for opening a first exchange with the control unit, the first exchange identified by a first identifier, the command including a transport command control block (TCCB), the TCCB including at least one device control word (DCW) and the TCCB being obtained by a location identified by a transport control word (TCW);

setting a time period for completion of the input/output operation; and based on the input/output operation not completing within the time period, sending a message to determine whether the control unit has the first exchange, identified by the first identifier, open for the command, the sending of the message for opening a second exchange, the second exchange identified by a second identifier, wherein the message interrogates the control unit to determine whether the control unit has received the command.

10. The apparatus of claim 9, wherein the message is a Read Exchange Concise (REC) message.

11. The apparatus of claim 9, wherein completion of the operation comprises receiving a completion message from the control unit indicating that the operation is complete.

12. The apparatus of claim 9, further comprising:

receiving a response to the message, the response indicating whether the control unit has the first exchange, identified by the first identifier, open for the command; and based on the response indicating that the control unit has the first exchange open for the command, re-sending the message in an exchange to the control unit after an additional time period.

13. The apparatus of claim 9, further comprising:

receiving a response to the message, the response indicating whether the control unit has the first exchange, identified by the first identifier, open for the command; and based on the response indicating that the control unit has no first exchange open for the command, aborting the input/output operation.

14. The apparatus of claim 9, wherein sending the message comprises periodically sending the message until one of: i) completion of the operation, and ii) receipt of a response to the message indicating that the control unit does not have the exchange open for the command.

15. The apparatus of claim 14, wherein periodically sending the message comprises:

sending the message to the control unit upon expiration of the time period;

receiving a response from the control unit indicating that the control unit has the exchange open for the command;

setting an additional time period for completion of the operation; and re-sending the message upon expiration of the additional time period to determine whether the control unit is continuing to execute the operation.

16. The apparatus of claim 9, wherein:
the time period is a first time period for receiving a completion message from the control unit indicating that the operation is complete;
the message is a Read Exchange Concise (REC) message, and sending the message is based on not receiving the completion message within the first time period; and
the channel subsystem further performs:
receiving a response to the REC message, the response indicating whether the control unit has the exchange open for the command;
based on the response indicating that the control unit has the exchange open for the command, setting a second time period for completion of the operation; and
re-sending the REC message upon expiration of the additional time period to determine whether the control unit is continuing to execute the operation.

17. A method of processing communications between a control unit and a channel subsystem in an input/output processing system, the method comprising:
sending a command from the channel subsystem to the control unit to initiate an input/output operation, the sending of the command for opening a first exchange with the control unit, the first exchange identified by a first identifier, the command including a transport command control block (TCCB), the TCCB including at least one device control word (DCW) and the TCCB being obtained by a location identified by a transport control word (TCW);
setting a time period for completion of the input/output operation; and
based on the input/output operation not completing within the time period, sending a message to determine whether the control unit has the first exchange, identified by the first identifier, open for the command, the sending of the message for opening a second exchange, the second exchange identified by a second identifier, wherein the message interrogates the control unit to determine whether the control unit has received the command.

18. The method of claim 17, wherein the message is a Read Exchange Concise (REC) message.

19. The method of claim 17, further comprising: based on the response indicating that the control unit has the first exchange open for the command, re-sending the second message in an exchange to the control unit after an additional time period.

20. The method of claim 17, wherein sending the message comprises periodically sending the message until one of: i) completion of the operation, and ii) receipt of a response to the message indicating that the control unit does not have the exchange open for the command.

21. The method of claim 17, wherein:
the time period is a first time period for receiving a completion message from the control unit indicating that the operation is complete;
the message is a Read Exchange Concise (REC) message, and sending the message is based on not receiving the completion message within the first time period; and
the method further comprises:
receiving a response to the REC message, the response indicating whether the control unit has the exchange open for the command;
based on the response indicating that the control unit has the exchange open for the command, setting a second time period for completion of the operation; and
re-sending the REC message upon expiration of the additional time period to determine whether the control unit is continuing to execute the operation.

22. The computer program product of claim 1, further comprising:
receiving a response to the message, the response indicating whether the control unit has the first exchange, identified by the first identifier, open for the command;
based on the response indicating that the control unit has the first exchange open for the command, re-sending the message in an exchange to the control unit after an additional time period; and
based on the response indicating that the control unit has no first exchange open for the command, aborting the input/output operation.

23. The apparatus of claim 9, further comprising:
receiving a response to the message, the response indicating whether the control unit has the first exchange, identified by the first identifier, open for the command;
based on the response indicating that the control unit has the first exchange open for the command, re-sending the message in an exchange to the control unit after an additional time period; and
based on the response indicating that the control unit has no first exchange open for the command, aborting the input/output operation.

24. The method of claim 17, further comprising:
receiving a response to the message, the response indicating whether the control unit has the first exchange, identified by the first identifier, open for the command;
based on the response indicating that the control unit has the first exchange open for the command, re-sending the message in an exchange to the control unit after an additional time period; and
based on the response indicating that the control unit has no first exchange open for the command, aborting the input/output operation.

* * * * *